US006672018B2

(12) United States Patent
Shingleton

(10) Patent No.: US 6,672,018 B2
(45) Date of Patent: Jan. 6, 2004

(54) SOLAR MODULE MOUNTING METHOD AND CLIP

(76) Inventor: Jefferson Shingleton, 7322 Parcell Rd., Auburn, NY (US) 13021

( * ) Notice: Subject to any disclaimer, the term of this patent is extended or adjusted under 35 U.S.C. 154(b) by 107 days.

(21) Appl. No.: 09/975,572

(22) Filed: Oct. 12, 2001

(65) Prior Publication Data

US 2003/0070368 A1 Apr. 17, 2003

(51) Int. Cl.[7] .............................................. E04D 13/18
(52) U.S. Cl. ........................ 52/173.3; 52/464; 52/665; 136/244; 126/621; 126/623
(58) Field of Search ................. 52/173.3, 460, 52/464, 465, 689, 665, 235; 136/244, 251; 126/623, 621, 622; 411/84–85, 104

(56) References Cited

U.S. PATENT DOCUMENTS

| | | | | |
|---|---|---|---|---|
| 1,893,481 A | * | 1/1933 | Adams | 52/489.1 |
| 3,210,716 A | * | 10/1965 | Meacham | 439/117 |
| 3,805,465 A | * | 4/1974 | Dietrich | 52/235 |
| 4,114,595 A | * | 9/1978 | Barker | 52/460 |
| 4,207,868 A | * | 6/1980 | Peterson | 126/620 |
| 4,452,027 A | | 6/1984 | Desai | 52/712 |
| 4,580,385 A | | 4/1986 | Field | 52/578 |
| 4,942,865 A | * | 7/1990 | Pierce-Bjorklund | 126/633 |
| 4,966,631 A | | 10/1990 | Matlin et al. | 136/244 |
| 5,143,556 A | | 9/1992 | Matlin | 136/244 |
| 5,571,338 A | * | 11/1996 | Kadonome et al. | 52/173.3 |
| 5,762,720 A | | 6/1998 | Hanoka et al. | 136/251 |
| 5,946,874 A | * | 9/1999 | Roberts | 52/464 |
| 6,105,317 A | * | 8/2000 | Tomiuchi et al. | 52/173.3 |
| 6,111,189 A | | 8/2000 | Garvison et al. | 136/244 |
| 6,412,239 B1 | * | 7/2002 | Miller | 52/204.1 |

OTHER PUBLICATIONS

Super Sky Products, Inc., Super Sky Glazing Systems, product description, http://www.supersky.com/glazingsystems/index.html, Aug. 1, 2001.
Simon Group, Simon Furniture fittings, product description, http://www.simongruppe.de/eng/kl/2013006.html, Aug. 1, 2001.
Bainbridge Mfg. Co., Cabinet Master Clips, http://bainbriegemfg.com/cgi–bin/product_base.cgi?, Aug. 1, 2001.
Meek, Meek—A Reflection of Quality, http://www.meekmirrors.com/MirrorAccessories.htm, Aug. 1, 2001.

* cited by examiner

*Primary Examiner*—Winnie S. Yip
(74) *Attorney, Agent, or Firm*—Bernhard P. Molldrem, Jr.

(57) ABSTRACT

A solar collector array is formed of a plurality of solar panels mounted on a frame made of support beams which may be sheet metal channel members. A butyl tape or other glazing material is applied between the back laminate of the solar panel and the beam. Clips are used to clamp the panels to the support beams. The clips have an upper portion that is generally T-shaped in profile, and a retainer in the form of a channel nut or bar, with a threaded hole that receives a bolt or similar threaded fastener. The retainer biases against the inwardly directed flanges of the channel support beam. Electrical wires and mechanical fasteners are concealed within the support beams.

19 Claims, 12 Drawing Sheets

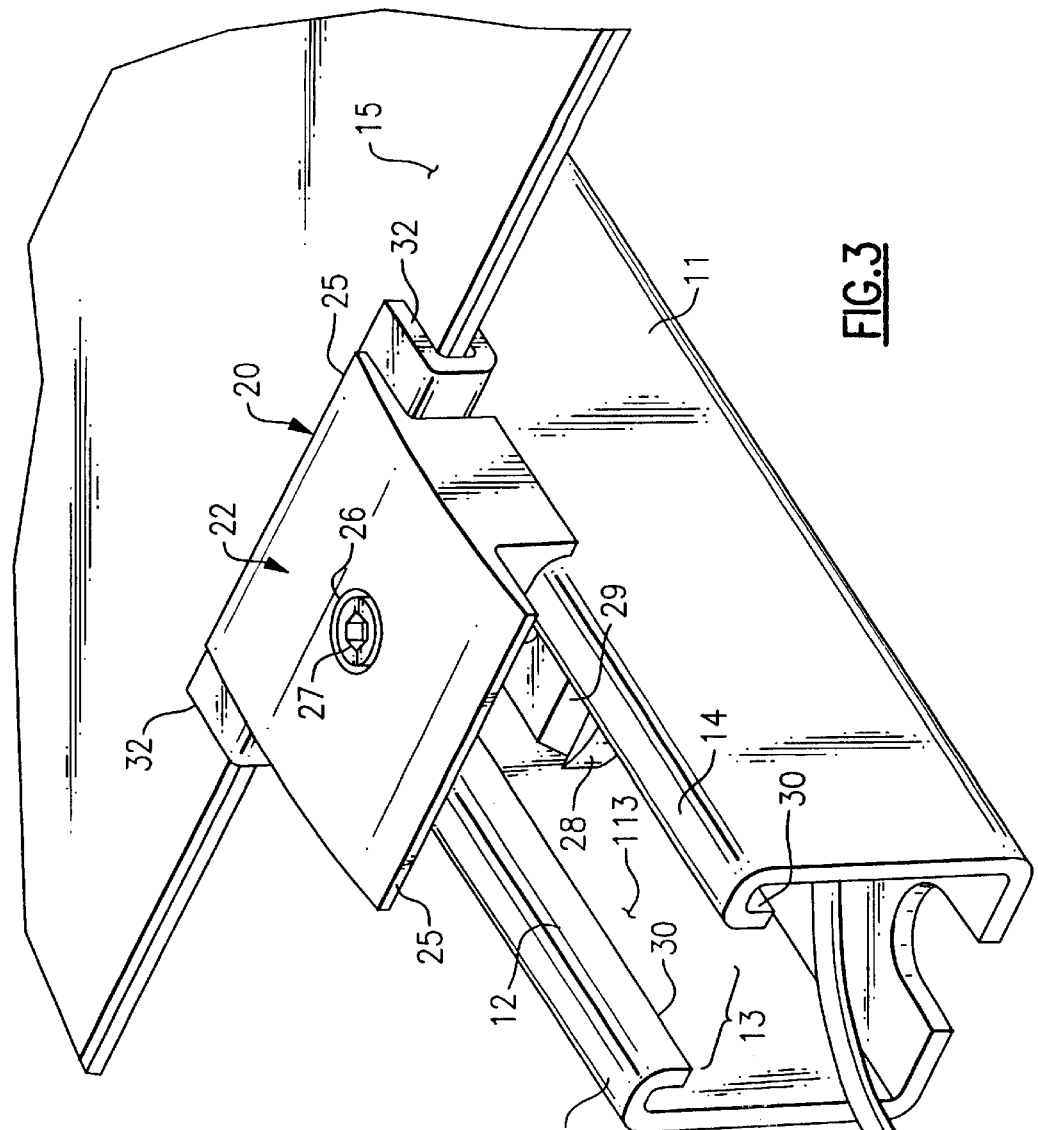
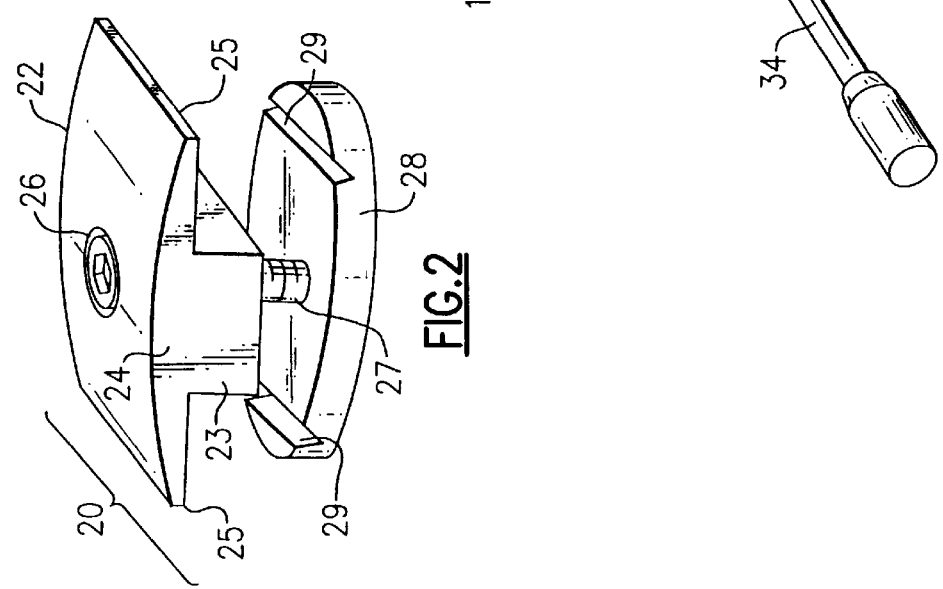
FIG.3
FIG.2

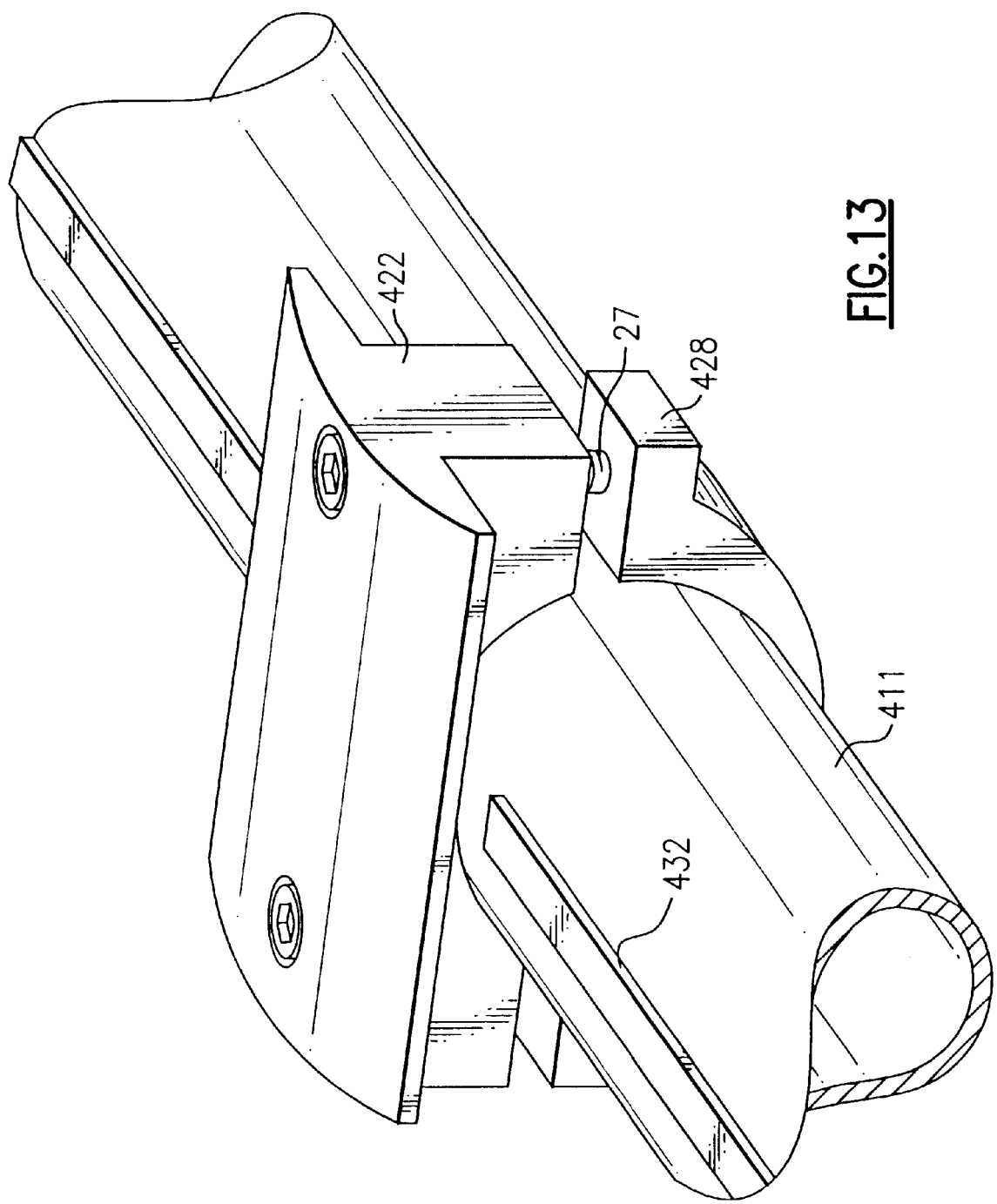

SOLAR MODULE MOUNTING METHOD AND CLIP

BACKGROUND OF THE INVENTION

This invention relates to solar energy collection, and is more particular directed towards an arrangement for attaching solar modules to a supporting structure, such as a roof, rack or tracking structure. The invention is more particularly directed to improvements in hardware clips that facilitate the attachment of unframed photovoltaic modules on any of a variety of supporting structures, for the purpose of constructing arrays of photovoltaic modules in a system to produce electricity. The invention may be employed for the attachment of solar thermal panels and non-solar panels as well.

Photovoltaic systems are used for a variety of purposes, including for use as a utility interactive power supply, as a power supply for remote radiotelephone station, or to power an unattended monitoring station, for example.

Photovoltaic systems consist of one or more photovoltaic (PV) modules, arranged in arrays, attached to a supporting surface, and interconnected with electrical wiring to switches, inverters, battery chargers and batteries, etc. This invention relates to a novel method for attaching the PV modules to a variety of supporting structures. PV modules typically consist of a PV laminate and they may also include a frame. The PV laminate typically consists of an assembly of crystalline or amorphous semiconductor devices electrically interconnected and encapsulated between a transparent front cover of glass or plastic and a back cover. Also, a PV module typically includes electrical conductors exiting the laminate edge or back cover which conduct the solar generated current through the electrical circuit including the PV module. The back cover is typically a tough insulating material that is an electrical insulator, is impervious to moisture, and is often made of either flexible Tedlar and/or other foil, film or rigid glass or plastic.

For PV modules that incorporate a frame, the frame often consists of multiple aluminum extrusion elements which are assembled to surround the laminate, and are mechanically interconnected at the module corners. The frame sections often include a channel to capture the laminate, which channel often is filled with a sealant during the frame assembly procedure. The sealant, often a butyl compound in the form of a gunable caulk, tape or putty, acts to promote the sealing of the edge of the laminate, to provide an adhesive attachment between the frame and the laminate, and to provide a cushion to protect the laminate edge from mechanical damage.

For PV modules that incorporate frames, those frames typically include holes which may accommodate fasteners for the attachment of the PV module to a supporting surface. In this way, the PV module may be attached to a variety of supporting structures, including a tracking structure described in U.S. Pat. No. 6,058,930, or attached onto fixed-tilt structures or to the roof of a building such as described in U.S. Pat. No. 6,111,189.

The PV module frame serves many other purposes. In addition to providing laminate edge protection and a means for mounting the PV module, the PV module frame provides a means to grip the PV module to carry and hold that during installation; the frame provides the appearance of a finished perimeter to the PV module; and the frame may be provided with a finish color to blend according to architectural requirements. In some cases, as in U.S. Pat. No. 6,111,189, the frame may provide means to conceal and protect the interconnection wiring in a PV array.

If the frame is made of a conducting material, the frame must be connected to a grounding conductor as a safety precaution in the event that the PV circuit within the PV laminate inadvertently develops an electrical short to the frame. The frame and the conductors and other electrical components and labor required for the grounding of the frame represent significant portions of the cost of the photovoltaic module. These cost elements are accentuated by the historical falling cost of the PV laminate, and represents a barrier to PV generated electricity achieving a cost that is competitive with conventional power sources. The frame typically increases the volume of a PV module, and this reduces the packing density and increases the cost of shipping the PV module. Also, in order to limit the number of product variations that a manufacturer must offer, PV module frames are typically designed such that a single frame design may be used in a variety of "typical" applications. As a result, the typical frame may not be suitable for applications that have very specific requirements. Manufacturers must therefore also develop custom frames for those applications, and this increases the manufacturer's cost of operation and the PV module cost.

For these reasons, techniques have been investigated and developed to eliminate the requirement for frames for PV modules. In those cases, a variety of means have been developed to accommodate the attachment of the unframed PV laminate directly to a supporting surface.

In one example, as described in U.S. Pat. No. 5,143,556, mounting brackets are adhesively attached to the laminate back surface. The PV module is attached to the supporting structure by means of conventional fasteners engaging the clips and the supporting surface. This eliminates the cost of the frame and the requirement for grounding, but only partly increases the packing density. However, this introduces additional assembly and adhesive curing steps to the manufacturing process. The frameless PV module also specifically prescribes the required locations for the supporting structure members, and limits the number of attachments, thereby limiting the maximum allowable design pressure that the laminate may tolerate. This also imposes the requirement that the back side of the PV module be accessible during installation and module removal and replacement, which limits the application of this technique in typical building roof applications.

In another example, as described in U.S. Pat. No. 5,762,720, elements are bonded to the PV laminate back surface which elements can slidably engage the open side of a common electrical channel strut, including those marketed under the trademarks UNISTRUT™ and BLINE™. The method of the U.S. Pat. No. 5,762,720 has the advantages that no fasteners are required in order to attach the PV module to the supporting surface, that access is not required of the module back surface during installation, and that the requirement for grounding may be eliminated. One limitation of this technique is that if it becomes necessary to remove or replace only a single one of a number of PV modules that are slidably engaged to a supporting channel, it may be necessary to remove several of the adjacent PV modules as well. That limits the practicality of this technique, particularly in building roof applications. This technique also has the limitations described in the U.S. Pat. No. 5,143,556, above.

Another type of frameless PV module is described in U.S. Pat. No. 6,075,201, intended for use as a curtain wall or roof element.

Another approach pursued for attaching PV modules in building roof and other applications, has been to utilize conventional curtain wall, sloped glazing, skylight and other common building glazing materials and techniques. This approach typically employs conventional aluminum structural elements with glazing gaskets and cover caps. This has been shown to be particularly effective in building applications where the PV laminates are basically substituted for some or all of the conventional building glass or plastic glazing or other building panels, and where there is a significant requirement for weatherproofing the building exterior surfaces. This technique does not require special fixtures or clips permanently affixed to the module, as in U.S. Pat. Nos. 5,143,556 and 5,762,720. In addition, this technique accommodates the removal and replacement of single individual PV modules in an array of modules. However, the cost of such conventional building glazing materials and techniques cannot be economically justified in all PV applications, especially in those applications that do not have the rigorous architectural and weatherproofing requirements of building glazing, wall and roof elements.

The need that now exists is a low cost method for attaching a variety of unframed PV modules to a variety of supporting surfaces, including building surfaces, i.e., roofs and walls, where the applications do not impose strict architectural requirements or requirements for absolute weatherproofing. These applications include many non-building applications, as well as building rain screen architectural applications and building roof and wall applications where the PV modules are placed adjacent to or onto a finished waterproof building roof or wall surface.

Limited efforts have been undertaken to develop such methods for attaching a variety of unframed PV modules to a variety of supporting surfaces. There are a variety of common mounting clips and hardware widely used for other purposes that have self-evident applicability, and have been employed. These clips include those developed for attaching glass mirror panels and other panels to walls and to supporting surfaces. Some well-known clips have been employed for mounting glass mirror panels. Other clips have been developed for mounting other panels to walls and to other surfaces, for example, as described in U.S. Pat. Nos. 4,580,385 and 4,452,027.

The metal clips for surface mounting of glass mirror panels do not require access to the rear surface of the glass mirror panels. Such clips may incorporate flexible rubber cushion pads to protect the edge of the mirror panels and to spread the loads on the mirror back surface. Molded plastic clips function in a manner similar to the metal clip, except that cushions are not required owing to the softer nature of the plastic. The plastic clips may be free to rotate on their fastener, and depend on the clip contact with the edge of the glass mirror panel to properly align the clip to the glass mirror panel.

The clips in U.S. Pat. No. 4,580,385 were developed to accommodate the simultaneous attachment of two adjacent panels to a single supporting surface. Those also achieve attachment without the use of additional fasteners, by engaging a supporting surface consisting of a multiple-pierced hollow closed structural supporting element.

The clips in U.S. Pat. No. 4,452,027 accommodate the attachment of two adjacent panels, where the fastener mounting surface is depressed below the panel surface to accommodate the panel thickness. The clips in this patent also employs a rivet to attach the clip to the supporting element. Those clips align with the panel during installation by their contact with the edge of the attached panel.

Accordingly, the concepts described by these common mirror clips and glass panel clips have been adapted for employment in the mounting of PV modules, as will be described here.

U.S. Pat. No. 4,966,631 describes a "supported photovoltaic array" which includes the use of clips incorporating some of the features of the common clips. Those clips are mounted from the front of the PV module, and incorporate "cushions" to protect the edge of the PV module and to spread the loads on the PV module back surface. Those clips become properly aligned to the PV module during installation by their contact with the edge of the attached PV module. The clips incorporate a fastener mounting surface that is depressed below the PV module surface to accommodate the PV module thickness.

The arrangement described in this U.S. Pat. No. 4,966,631 has a number of practical limitations.

Firstly, the cushioning pads do not protect the entire interface of the PV module back surface and the supporting surface. In practice, it is often the case that the surface of the structural elements is rough, and without a cushion at the entire interface the rough uncushioned surface of the support can easily damage the PV module back surface and/or lead to stress laminate concentrations that can damage the laminate elements including the laminate cells, electrical interconnections and the laminate back cover. Damage to the PV module back cover can lead to the PV module becoming electrically shorted to the support beam. This leads to a significant safety hazard.

Secondly, the PV module back surface contact with the structural element is not continuous and therefore does not offer complete support to the PV module against loads such as wind pressure impinging on the module front surface. As a result, with loads impinging on the PV module front surface, the PV laminate is allowed to deflect toward the supporting element. That leads to limitations in the maximum design load that the PV module may be exposed to from pressures acting on the PV module front surface.

Thirdly, in the design of U.S. Pat. No. 4,966,631, loads such as wind loads impinging on the PV module back surface are resisted only by these clips, which are acting only at discrete points on the PV module perimeter. This leads to high stress concentrations in the PV laminate front cover under certain loading conditions, and leads to limitations in the maximum design load that the PV module may be exposed to from loads acting on the PV module back surface.

Fourthly, during installation, the PV modules may not initially be placed without the clips in position. Therefore the clips must either be placed first, requiring that the clips be precisely pre-positioned, or that the clips and PV modules be placed simultaneously, which is an awkward maneuver for the installer. This is a particular limitation for building applications where the access to install the PV module may be difficult and awkward on account of the elevation and orientation of the building surface.

Fifth, removal and replacement of a single PV module attached with conventional fasteners would require free access to the space beneath the PV module. Removal and replacement of a PV module attached with rivets would require the awkward and difficult removal of rivets from a position above the PV module to be removed.

Sixth, the arrangement does not provide for the concealment or protection of electrical conductors beneath the PV modules.

Seventh, the clip in U.S. Pat. No. 4,966,631 does not provide a means to conceal the fasteners or other means to provide a more finished, attractive appearance to the clip installation.

Finally, the panels of PV modules mounted in this fashion, as shown in U.S. Pat. No. 4,966,631, have only limited stability against loads, including gravity loads, acting in the plane of the PV modules. This is a significant limitation, since it is common practice to depend on some "lateral stability" sufficient to accommodate the assembly, transport and installation of panels of multiple PV modules. In this case, that stability is limited to that which is developed by the contact pressure developed at the discrete clip connection points. And that contact pressure can lead to stress concentrations in the PV module laminate and front and back covers. In addition, the panels of multiple PV modules may deflect laterally due to their insufficient "lateral stability." The structure can deform into a parallelogram, with the mounting clips being brought into closer contact with the PV module laminate edge on one side. This can lead to overcompression and failure of the clip cushion, and can lead to increased stress and mechanical contact between the clip and the laminate. It is well understood that nearly all failures of glass plates, regardless of the specific load condition, are initiated at the edge of the glass plate. As a result, in this instance, the increased stress and/or mechanical contact between the clip and the PV module glass front or rear cover can lead to the PV module failure at lower loads than would have otherwise been anticipated.

Consequently, none of the clips described hereinabove adequately address the requirements of a universal clip or attachment mechanism for the attachment of a variety of unframed PV modules to a various supporting surfaces.

OBJECTS AND SUMMARY OF THE INVENTION

Accordingly, it is the object of this invention to provide a means to attach unframed PV modules or other panels on a variety of supporting surfaces that avoids the limitations of the prior art.

It is another object of this invention to provide an attachment system that limits the stresses in the PV laminate that are induced when structural loads are applied to the PV module front and back surfaces.

It is another object of this invention to simplify the process of safely and expeditiously attaching, removing and replacing PV modules on a supporting surface.

It is yet another object of this invention to provide a means to conceal and protect the electrical conductors in an array of PV modules.

It is still another object of this invention to provide the means to provide lateral stability for a panel of multiple PV modules.

It is a further object of this invention to conceal the fasteners holding the clip in place, and to provide a more finished appearance to the installed clip.

In accordance with an important aspect of the present invention, a row of solar panels or similar panels can be formed using a system of clips, fasteners, glazing material and supporting beams.

In one possible preferred embodiment, the supporting beams may be channel-shaped, i.e., beams with one open slotted side, with the open or slotted side of the channel facing upward toward the back surface of the PV module. The supporting beams may be other shapes as well, including tubes and other common structural shapes such as rods, angles, wide-flange beams, etc. The supporting beams may be attached to the surface of a new or existing roof, or may be attached to any common tracking structure or fixed-tilt structure. When a channel supporting beam is used, the fasteners attaching the channel to the supporting structure or roof may be concealed in the channel beneath the PV module. In a roof application, sealant may be placed on the underside of a channel supporting beam, to facilitate the sealing and waterproofing of the fastener holes in the roof membrane. With the PV modules and clips in place, a channel supporting beam can provide a continuous enclosed space in contact with the PV laminate back surface. With the PV module appropriately positioned, the PV laminate conductors may exit the PV laminate into this space, and in any case the PV module and/or array conductors may be concealed and protected in this enclosed wireway.

A glazing material, such as 3M VHB Acrylic Foam Tape or butyl glazing tape, or equivalent, may be applied to the top surface(s) of the channel (or, equivalently, to the back surface of the PV module) to provide a continuous cushion between the supporting surface (e.g., the channel member) and the PV laminate rear surface. In addition, the glazing tape or equivalent may be supplied with adhesive characteristics that adheres the PV laminates in position during the installation process and before the clips are attached, and provides a fall or partial adhesive attachment of the PV laminate back surface to the supporting element to increase the allowable loads on the PV laminate back surface and the lateral stability of a panel of multiple PV modules.

In several preferred embodiments, the clips may be fabricated as injection molded plastic, however they may be fabricated by alternative methods and from alternative materials such as of extruded and/or machined aluminum, stamped or brake formed steel, etc. If plastic, the plastic material, such as GE Noryl, could be selected for the required strength, with (glass) fillers if necessary, and UV stabilized and electrically insulative properties. The clips may be developed to attach to the supporting beam top surface. In the preferred embodiment the clips may extend beyond the width of the supporting beam as necessary to reduce the stress in the PV laminate under loads impinging on the PV module bottom surface. The clips may be shaped with grooves or extensions that engage the supporting beam elements or edges. This will cause the clips to take the proper orientation without a PV module in place, and will restrain the walls of the channel from buckling laterally and from disengaging the fastener attaching the clip to the supporting beam channel.

In some preferred embodiments, the clips are attached to the channel supporting beam with fasteners and hardware that engage the channel elements such that the clips may be installed anywhere along the channel supporting beam, without providing special holes or receptacles.

In many preferred embodiments, during installation the PV modules may be securely placed and positioned temporarily on the adhesive glazing tape, and removed and repositioned if necessary. The clips are designed to be fastened in place with or without PV modules in position. This facilitates the initial installation of the PV modules. This also facilitates the removal and replacement of the PV modules in future, without having to disturb the adjacent PV modules. Access to the underside of the support structure is unnecessary.

The above and many other objects, features, and advantages of this invention will be better understood from the ensuing detailed description, which is to be read in connection with the accompanying Drawing.

BRIEF DESCRIPTION OF DRAWINGS

FIG. 2 shows the clip of this embodiment.

FIG. 3 is a perspective view showing the clip of this embodiment attaching a solar panel to a channel support beam.

FIG. 13 is a perspective view illustrating another embodiment.

DETAILED DESCRIPTION OF THE PREFERRED EMBODIMENTS

Figure 1:
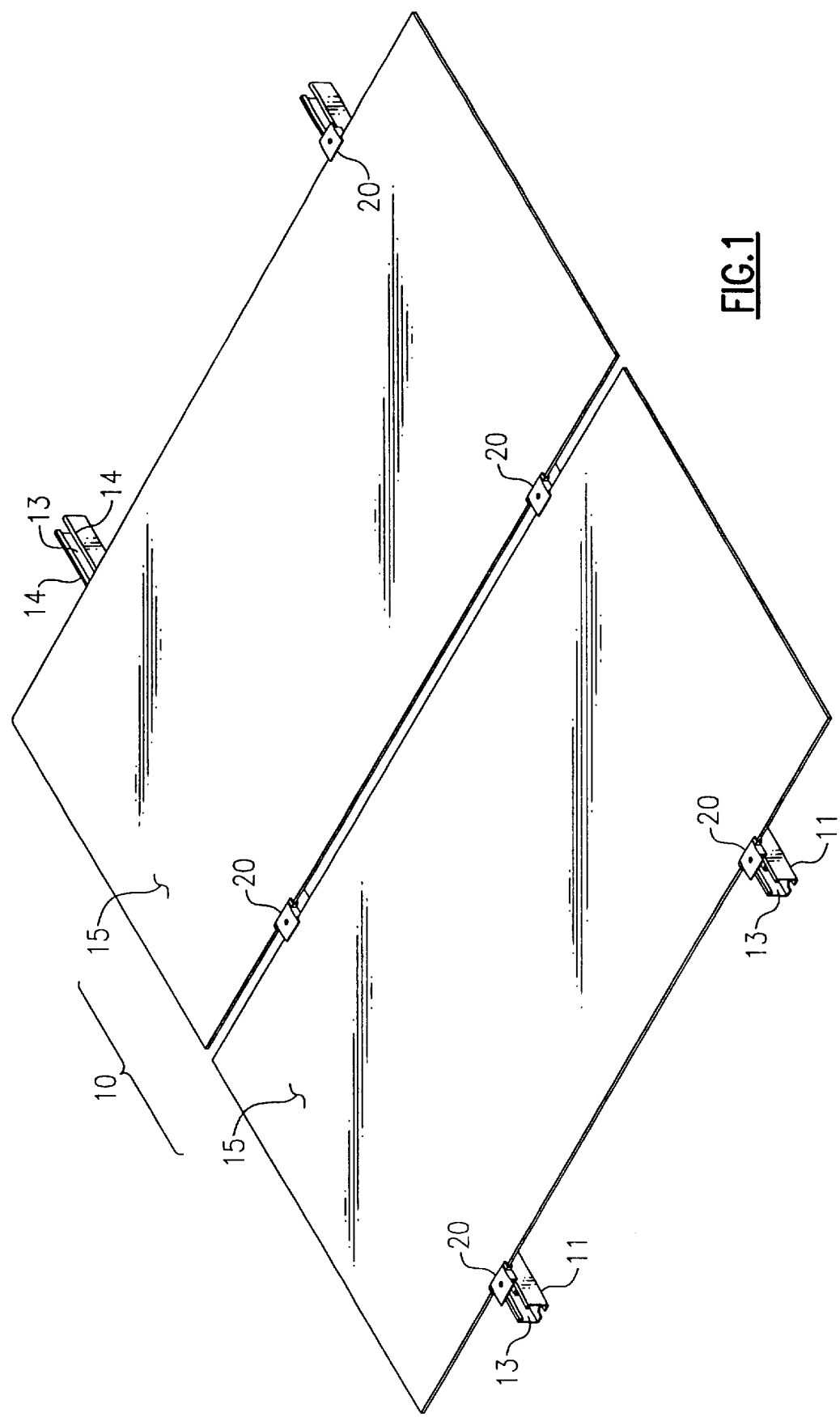
FIG. 1 is a perspective view showing a portion of an array of solar panels supported upon channel-type support beams, and attached thereto with connector clips according to one preferred embodiment of this invention.

With reference to the Drawing, and initially to FIGS. 1 to 3, an array 10 of solar panels is constructed in a technique employing as support beams a common electrical strut 11, i.e., channel, such as those sold under the trademarks Unistrut or Bline. Two support beams 11 are shown, although the number could be one, or could be more than two. The beams support some number of photovoltaic modules 15, although other types of solar panels could be employed. In this case, the PV modules 15 are frameless, constructed as generally described previously. The array 10 can be a roof mounted installation or a rack mounted installation.

The channel support beams 11 have a slotted front face 12, with a slot 13 defined between two inwardly directed flanges 14. The solar panel or PV module 15 has a glass or other transparent cover, with a back substrate on which there is a deposition of amorphous silicon, polycrystalline silicon, or equivalent material. In this instance, the PV modules are frameless, and they are supported directly upon the support beams 11, 11, and are held in place by means of clips 20. The clips 20 serve as hold down devices to hold the PV modules 15 against the beams 11. The clips 20 can be installed after the modules or panels 15 have been positioned, and can be removed to permit one of the panels or modules 15 to be changed out and replaced, if need be.

As shown in FIG. 2, the clip of this embodiment has a clip member 22 which can be molded of a suitable plastic material, i.e., semi-rigid material such as Noryl, with glass fiber fillers for added strength. In the preferred embodiment, the clips are injection molded. In other embodiments, the clip member 22 may be fabricated by an alternative method, e.g., extruded and or machined of aluminum, stamped or brake-formed of steel. The clip members may be adapted in shape to conform with the upper surface of the support beam or stud 11, and may be shaped with grooves or extensions that engage the supporting beam elements or edges in one or more places. The preferred embodiment of the clip member 22 as illustrated here is shaped to the upper surface 12 of the beam 11 so that the clip 20 assumes a proper orientation without a PV module 15 in place, and will restrain the walls of the channel support beam 11 from buckling laterally and from disengaging from the clip 20.

The clip member 22 of this embodiment has a generally T-shaped cross section, with an elongated stem portion 23 and an upper cap 24 that forms flanges or ledges 25, 25 that extend out along the sides of the stem portion 23, and define a recess at each side of the clip member 22. A central opening or bolt hole 26 extends vertically through the cap 24 and stem portion 23, and accommodates a cap screw 27 or other similar threaded fastener. A channel nut 28 has a female threaded opening that fits the threaded shaft of the fastener 27. The channel nut 28 is oblong or oval, and rotates to fit through the slot, and then rotates to engage the flanges 14. Here the channel nut 28 has notches 29 that fit against downward-oriented lips 30 on the flanges 14, 14. In this embodiment, the hole 26 is counter-bored to conceal the head of the cap screw 27. The channel nut may be the type that is furnished as an accessory with an available channel-type strut, or may be specially fabricated.

A suitable glazing material 32 is applied along the back of the panel 15, or optionally along the top wall of the support beam or stud 11, e.g., butyl glazing tape or acrylic foam tape. This provides a continuous cushion between the supporting surface of the beam 11 and the PV module 15 laminate rear surface. In addition, the tape 32 is preferably of an adhesive nature, so that it can adhere the PV modules 15 in place during the installation process and before the clips are attached. The tape 32 may provide a full or partial adhesive attachment of the PV module laminate back surface to the supporting elements to increase the permissible wind and gravitational load factors and to increase the lateral stability of the array 10 of multiple photovoltaic modules 15. The glazing tape 32 is shown here applied to the support beam top surface and is wrapped around the edge of the PV module 15 to form an adhesive cushion to protect and attach the module 15.

As shown in FIG. 3, the channel beams 11 may serve as conduits or raceways for electrical cables such as those carrying the electrical output from the modules 15. Thus electrical conductors 34 may be concealed and protected within the enclosure formed by the channel member 11 and the PV module back surface.

The length of the clip member 22 is somewhat beyond the width of the channel support beam 11, and its lower surface is contoured so as to extend over the edges of the top face of the beam 11. This feature helps to capture and retain the channel legs or flanges and provides additional strength to the assembly. In addition, this feature properly orients the clip member 22 relative to the support beam 11, regardless whether the module 15 is in place.

A second embodiment of the invention is shown in FIGS. 4 to 7, in which the PV modules 15 are supported on common roll-formed sheet metal support beams 111. These are wider than the beams described in connection with the previous embodiment, but like them these beams 111 have a slotted upper side with a slot defined between a pair of inwardly directed flanges 114. In this instance an extra-wide clip 120 is employed, with a molded plastic clip portion 122 that has an elongated stem portion 123 and a cap portion 124 in which flanges 125 extend along each side edge of the stem portion 123. There is a pair of bolt holes 126a and 126b, space along the lengthwise axis of the clip portion 122, and a pair of cap screws 127 or similar threaded fasteners are positioned respectively in these bolt holes. The cap screws fit into female threaded openings in a block or bar 128 that can be tightened up against the underside of the flanges 114, 114. As in the previous embodiment, butyl tape 32 or the equivalent is applied between the back of the PV module 15 and the top side of the support beam 111, and may continue over the edge of the module 15. Alternatively, the clip could be the same width as, or narrower than, the beams 111, but could have a clip bottom structure that projects down into the slot, thereby aligning the clip to the supporting beam.

Figure 6:
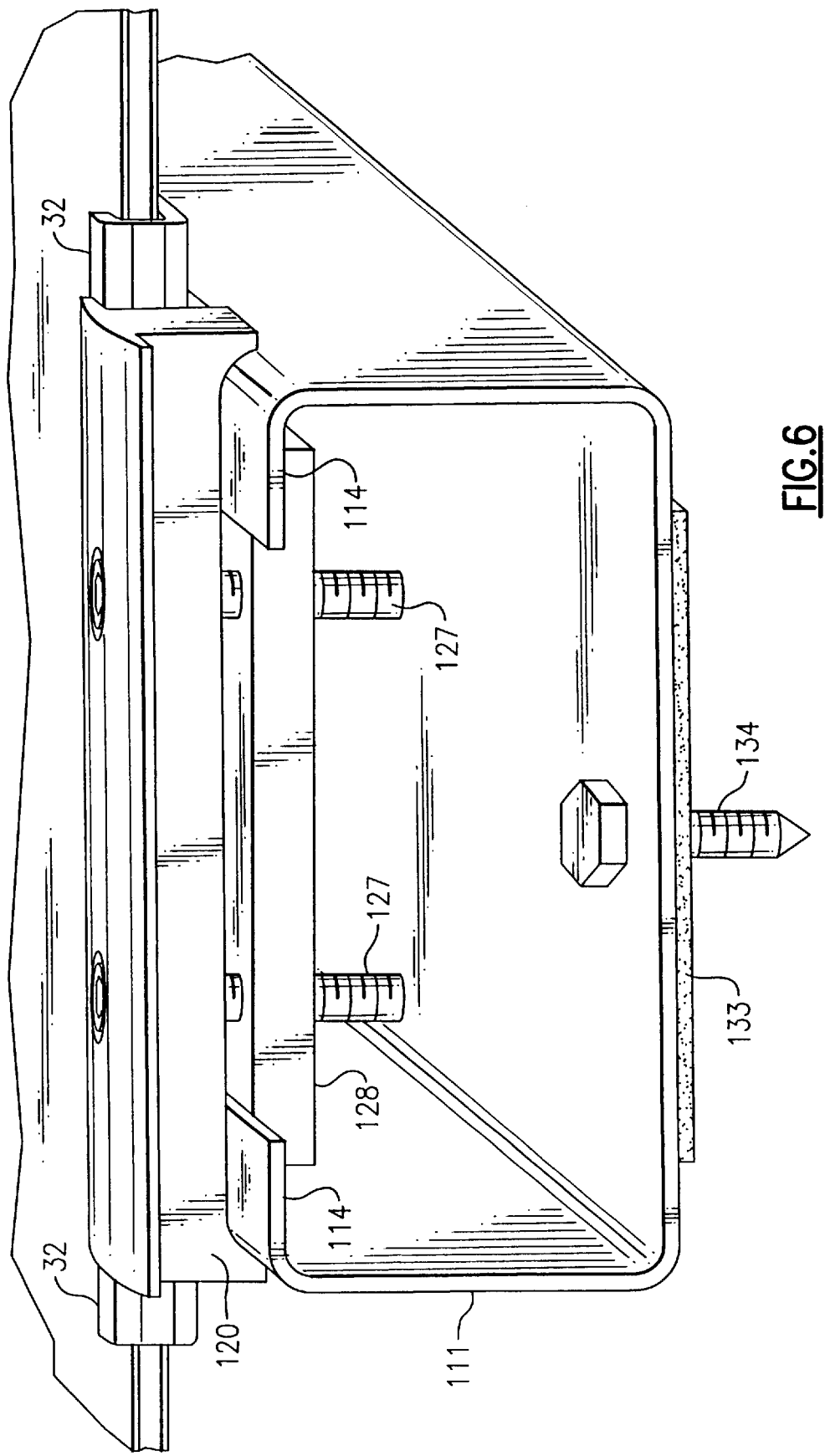
FIG. 6 is another view showing details of the clip of this embodiment.

As illustrated in FIG. 6, this embodiment may be used on a roof mounted installation, in which a sealing gasket material 133 is employed at locations where fasteners, e.g., hex screw 134 penetrate into the building roof or other support. The fasteners 134 are concealed within the channel of the support beam 111. As in the first embodiment, the beam can be used as a wireway, with the electrical cabling 34 concealed and protected within the enclosure formed by the beam 111 and the PV module 15.

Figure 4:
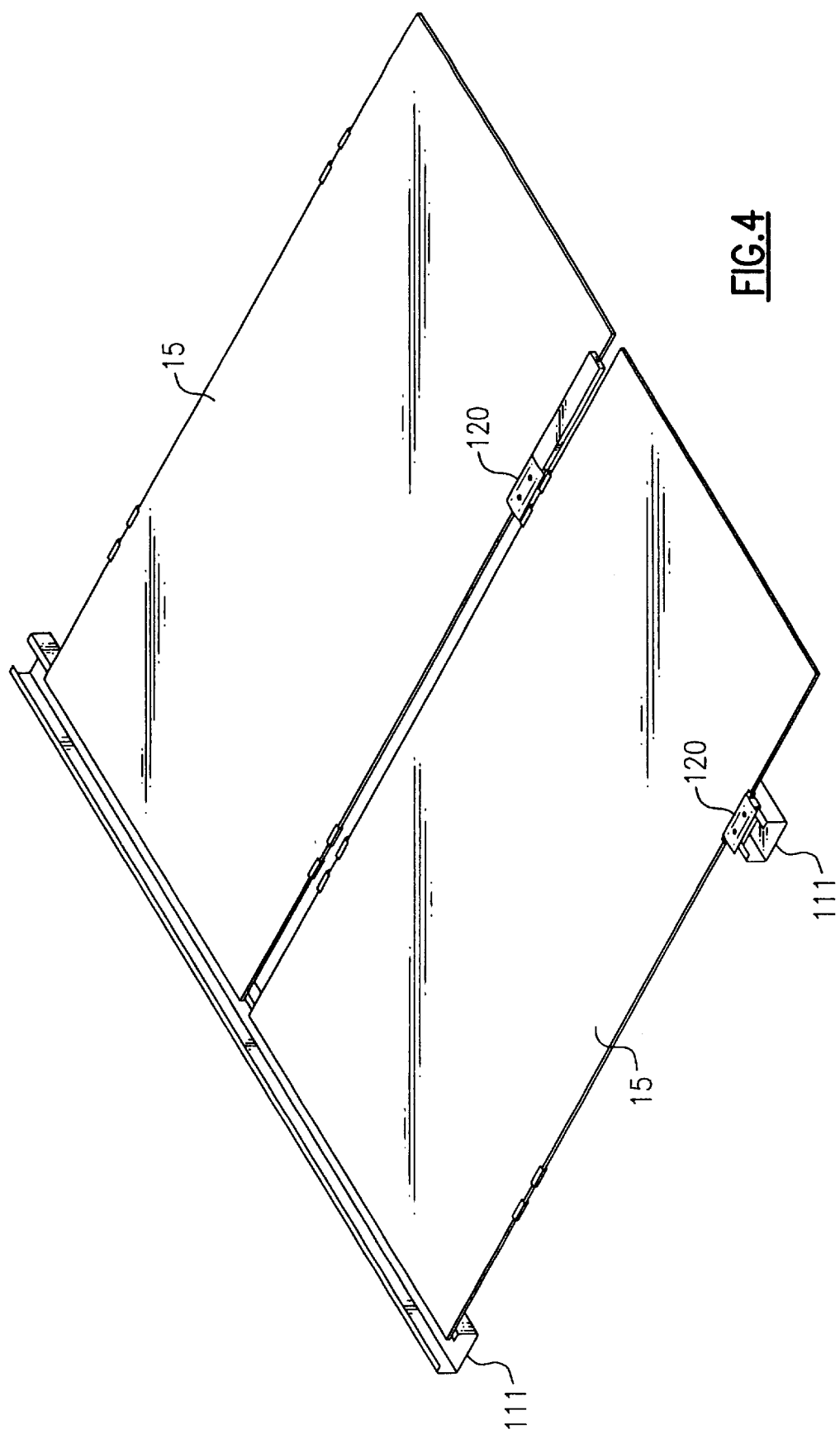
FIG. 4 is a perspective view showing a portion of an array of solar panels employing clips according to a second embodiment of this invention.
Figure 5:
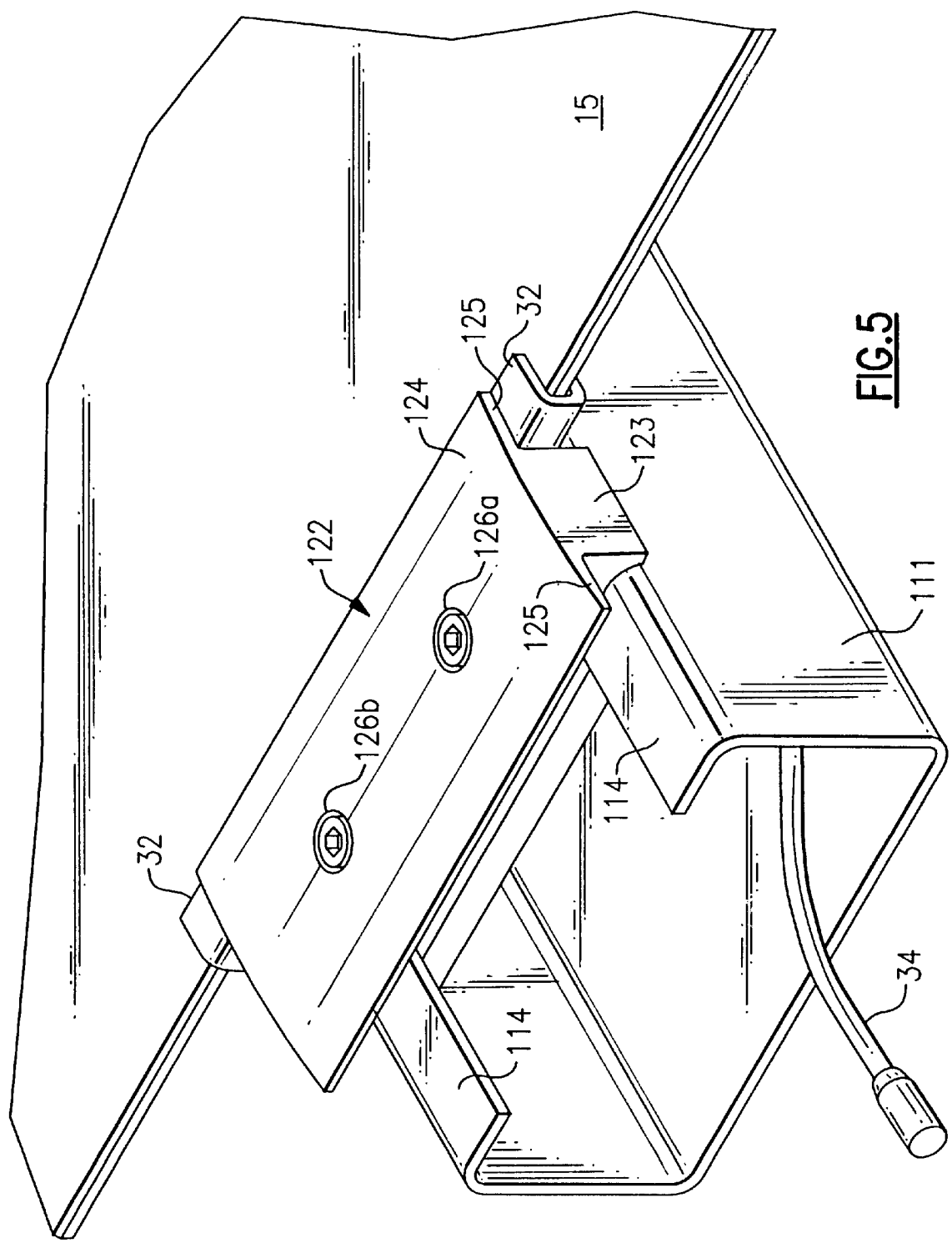
FIG. 5 is a perspective view showing the clip of this embodiment attaching a solar panel to a channel support beam.

As in the first embodiment, the length of the clip member 122 is somewhat beyond the width of the beam 111, and is contoured so as to extend over the edges of the top face of the beam 111. This feature helps to capture and retain the channel legs or flanges and provides additional strength to the assembly. In addition, this feature properly orients the clip member 122 relative to the support beam 111. The beam 111 may be positioned at an edge of the PV modules 15, as shown in FIG. 4. In such case there can be two rows of the PV modules supported on the beam, and held in place with the clips 120.

Figure 7:
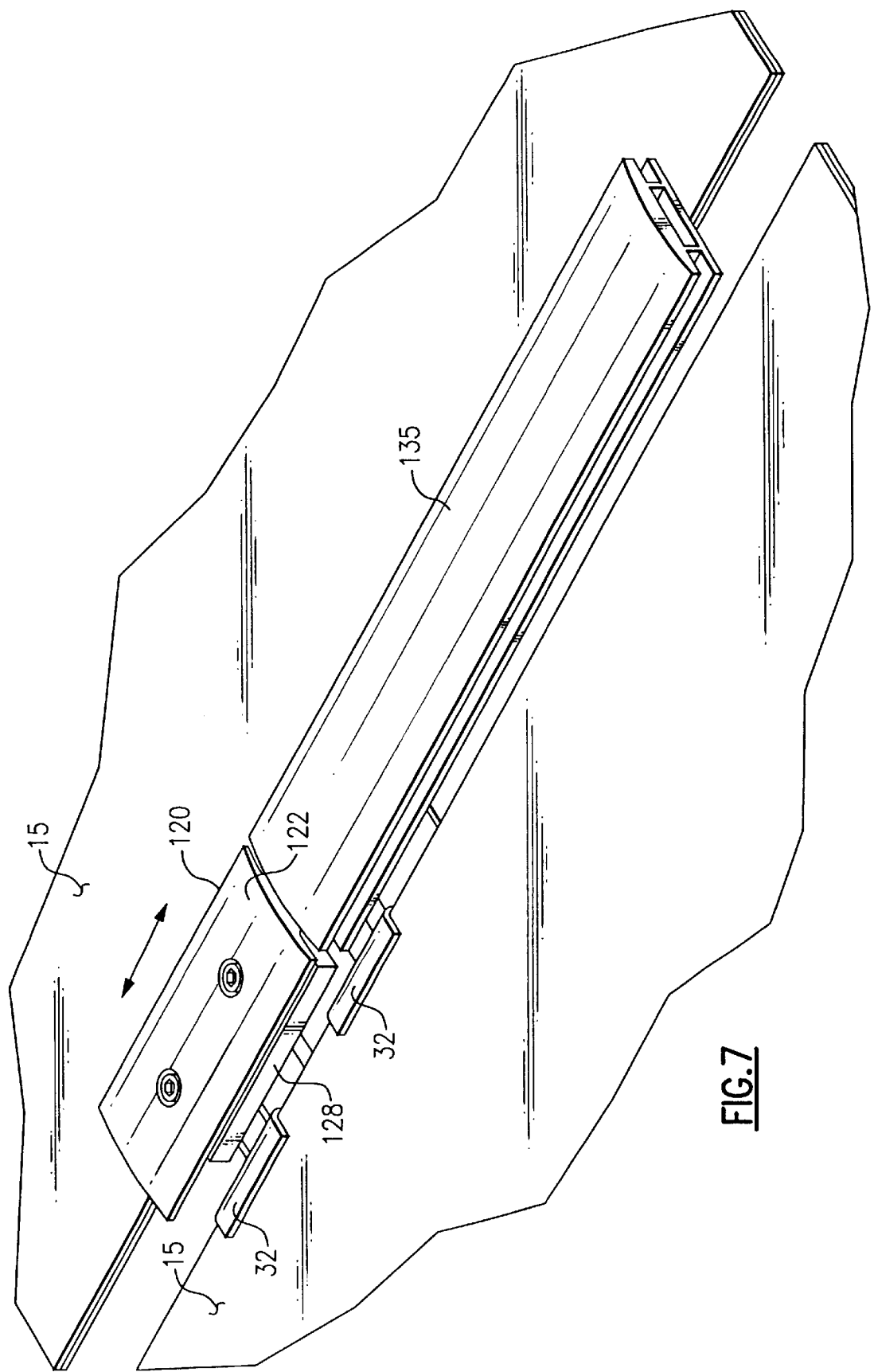
FIG. 7 is another perspective view showing additional details of this embodiment.

As shown in FIG. 7, the clip 120 may be installed between two pre-positioned PV modules, tipping the clip 120 slightly and sliding it laterally into place between the pre-placed modules 15, after which the cap screws 127 are rotated to tighten the bar 128.

A gasket 135, formed of an extruded rubber or other flexible material, is employed at each of the spaces between PV modules 15 as weatherproofing and also for the sake of an attractive uniform appearance. The gaskets 135 are soft and flexible, and can be pressed into place after the PV modules are in position.

Figure 8:
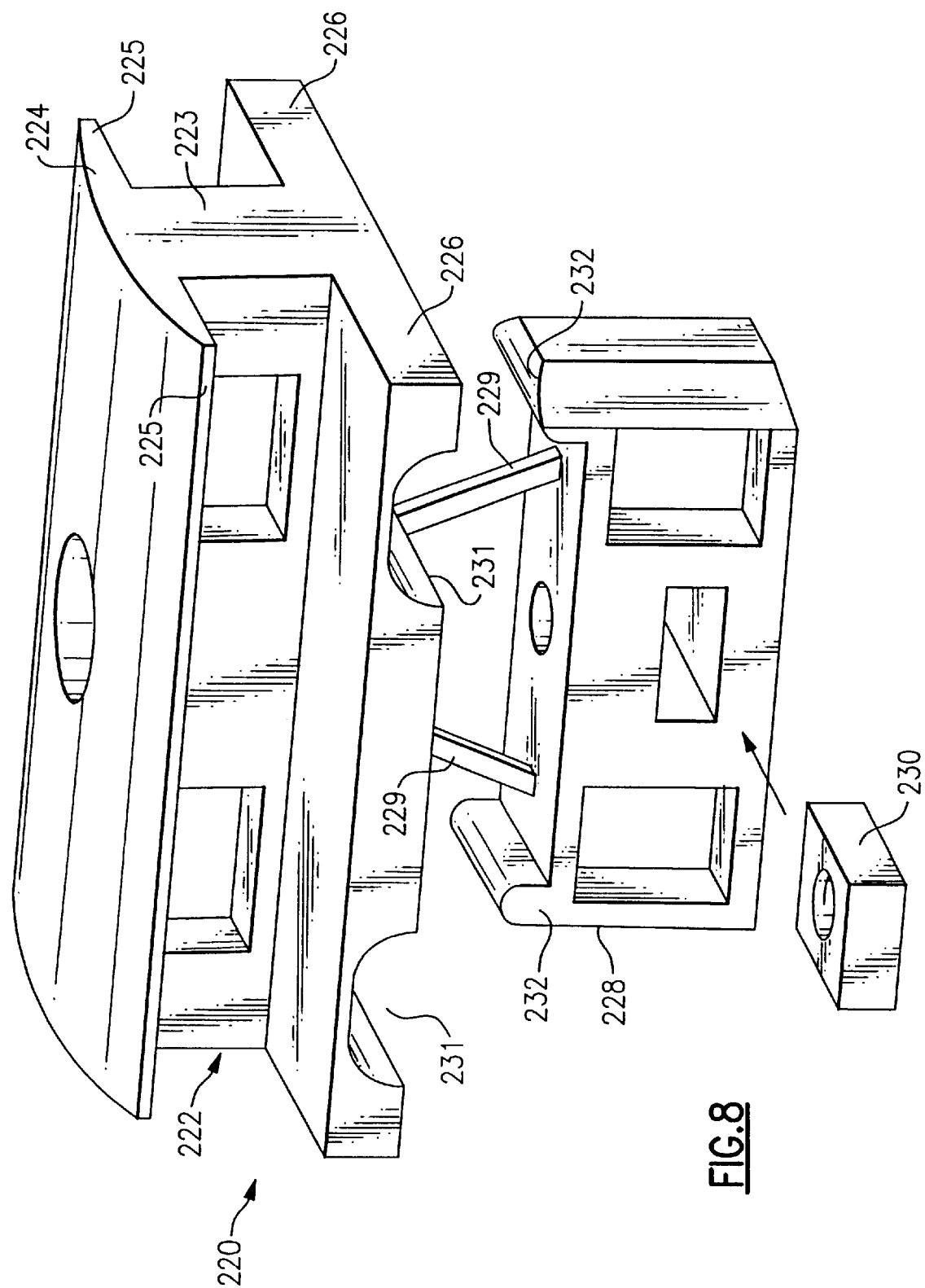
FIG. 8 is a perspective view of a clip according to another embodiment of this invention.
Figure 9:
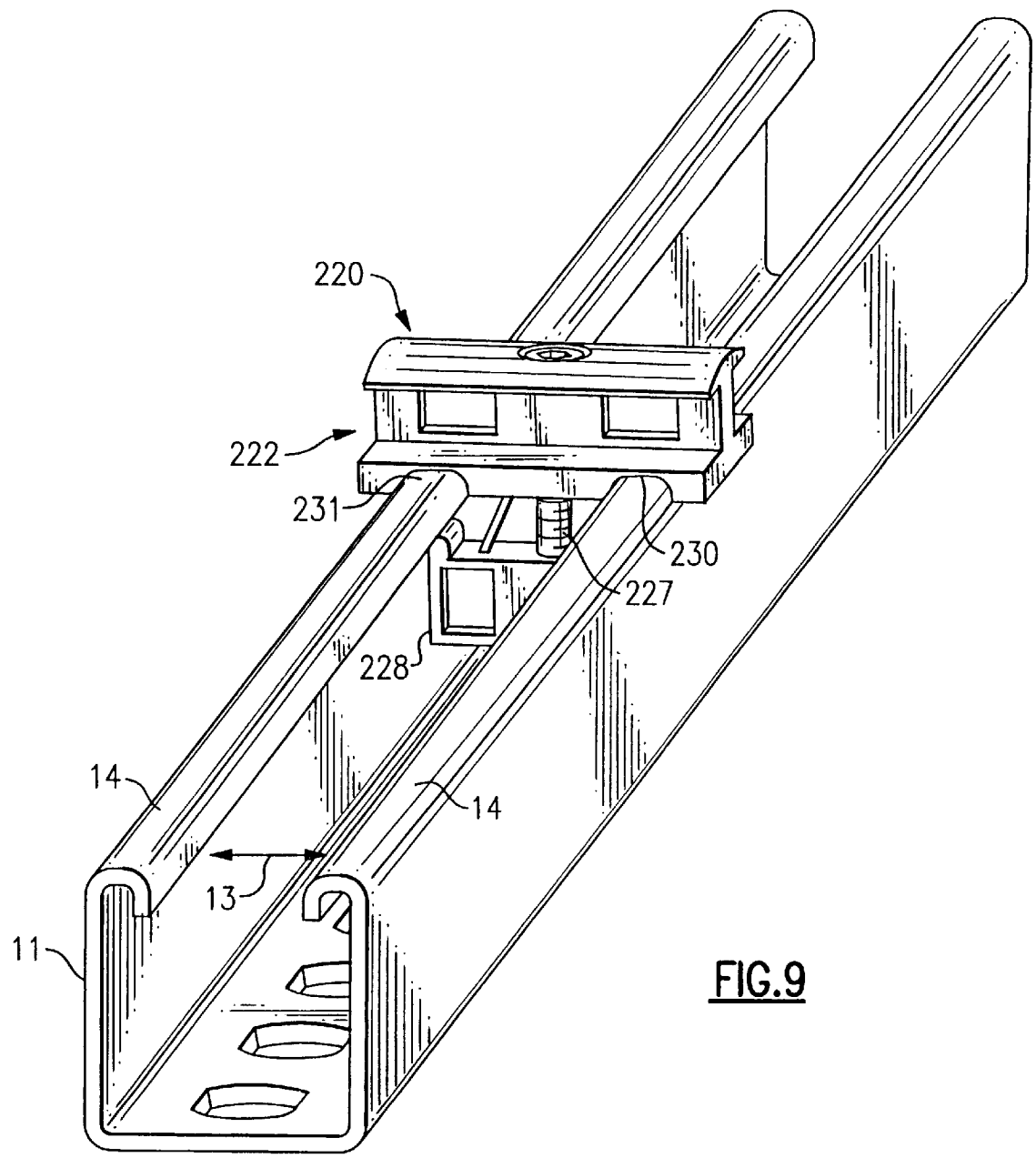
FIG. 9 illustrates the clip of this embodiment with a support beam.

Another embodiment is illustrated in FIGS. 8 and 9, in which a one-piece molded clip 220 incorporates an integral nut carrier, where a square nut, e.g., 230, may be inserted into a nut pocket in a lower clamp portion 228 to engage a threaded fastener, i.e., cap screw 227 for clamping the clip 220 to a support beam 11. Here the beam 11 may be of the same type as shown in connection with the embodiment of FIGS. 1 to 3, e.g., a Unistrut™ style channel support beam. Optionally, the lower portion 228 could incorporate a tapped hole or a threaded insert molded in place, to engage the clip threaded fastener.

In this embodiment, the upper clip portion 222 has a stem portion 223 and a cap portion 224, as in the previous embodiments, as well as a pair of lower flanges 226 that extend along side edges of the stem portion, so that the flanges 226 together with the upper flanges 225 define recesses to accommodate the thickness of the PV module.

There are transverse recesses 231 at the underside of the upper clip portion 222 which engage the inward flanges 14 of the respective channel beam 11, and serve both to orient the clip 120 relative to the beam and also to add strength to the beam when the clip is installed in place.

A pair of struts or connecting leg members 229 join the upper and lower clip portions 222 and 228, and keep the upper and lower positions properly oriented in respect to one another during installation. When the clip 220 is in position, the cap screw 227 is rotated to bring the lower portion 228 up into engagement with the flanges 14 of the beam. The struts 229 are either frangible or sufficiently flexible so as to break or deflect when the cap screw 227 is tightened down.

The molded-in recesses between flanges 225 and 226 provide a cushioning for the edges of the panel or module 15. The lower clip portion 228 may be provided with upwardly extending ears 232 that seat into curved recesses underneath the flanges 14 of the beam. In some possible embodiments, the ledges 226 could be omitted.

Figure 10:
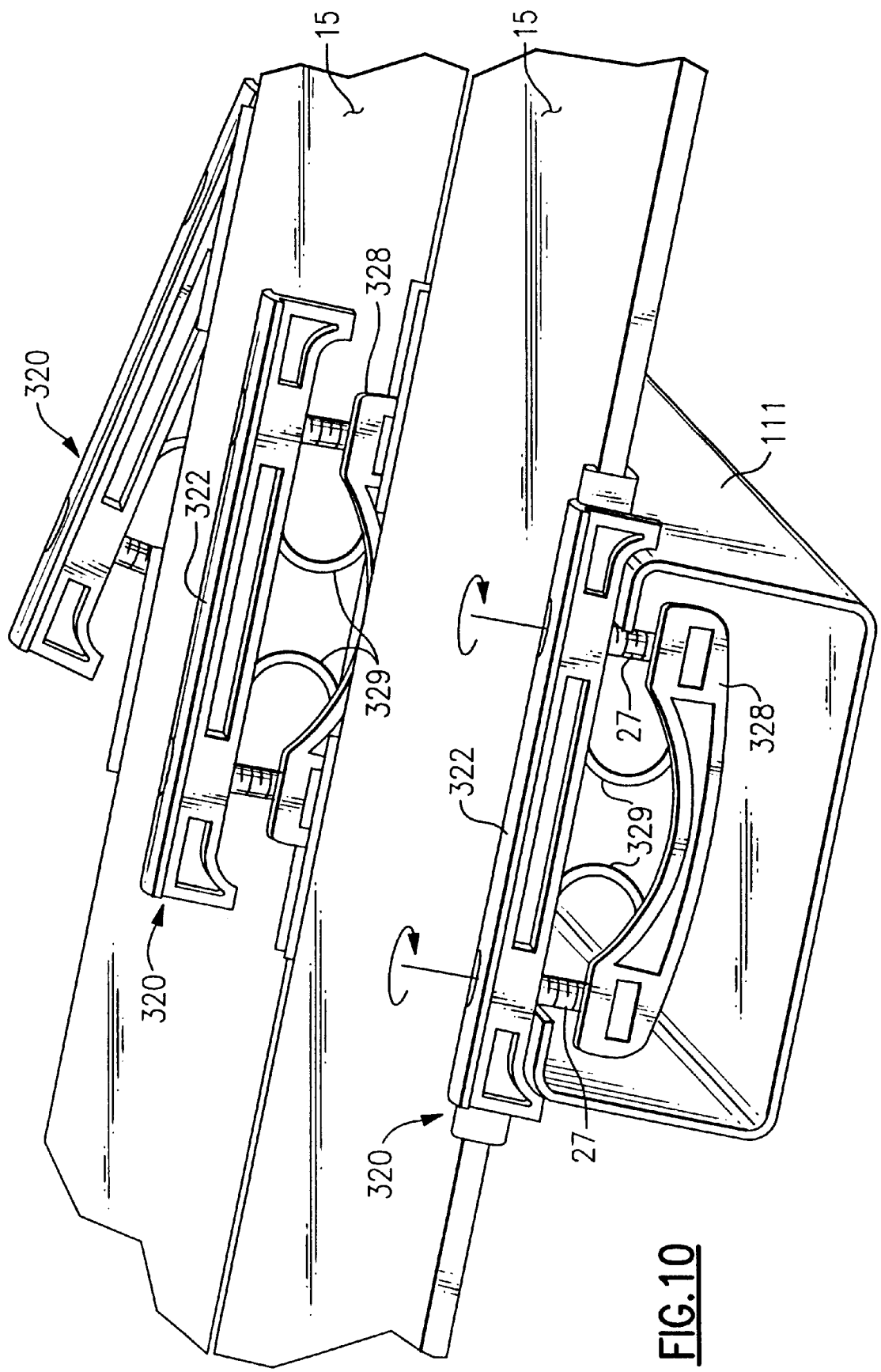
FIG. 10 is a partial perspective of an array of solar panels employing a clip of yet another embodiment.
Figure 11:
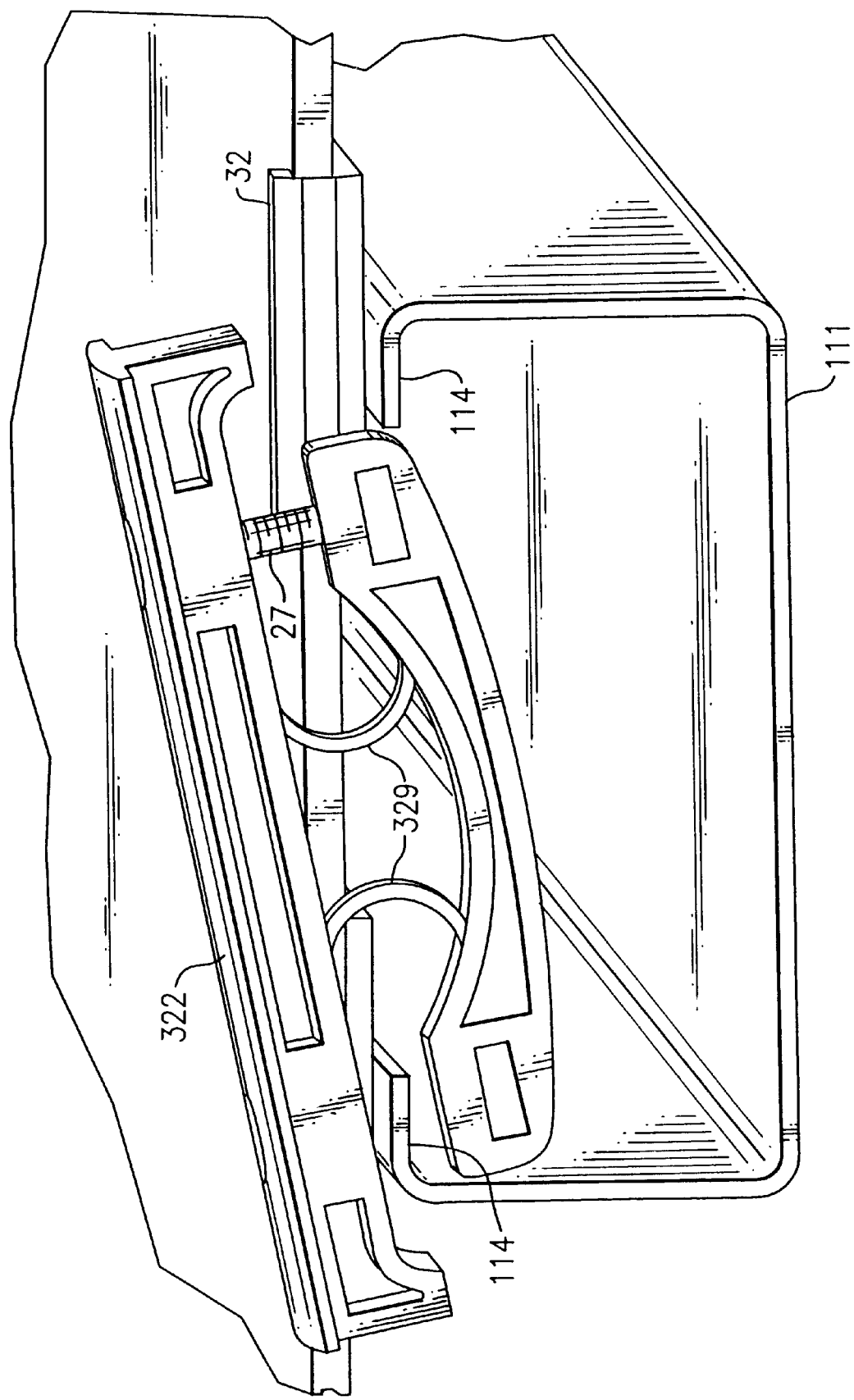
FIG. 11 is a view showing the installation of the clip of this embodiment in a channel support beam.
Figure 12:
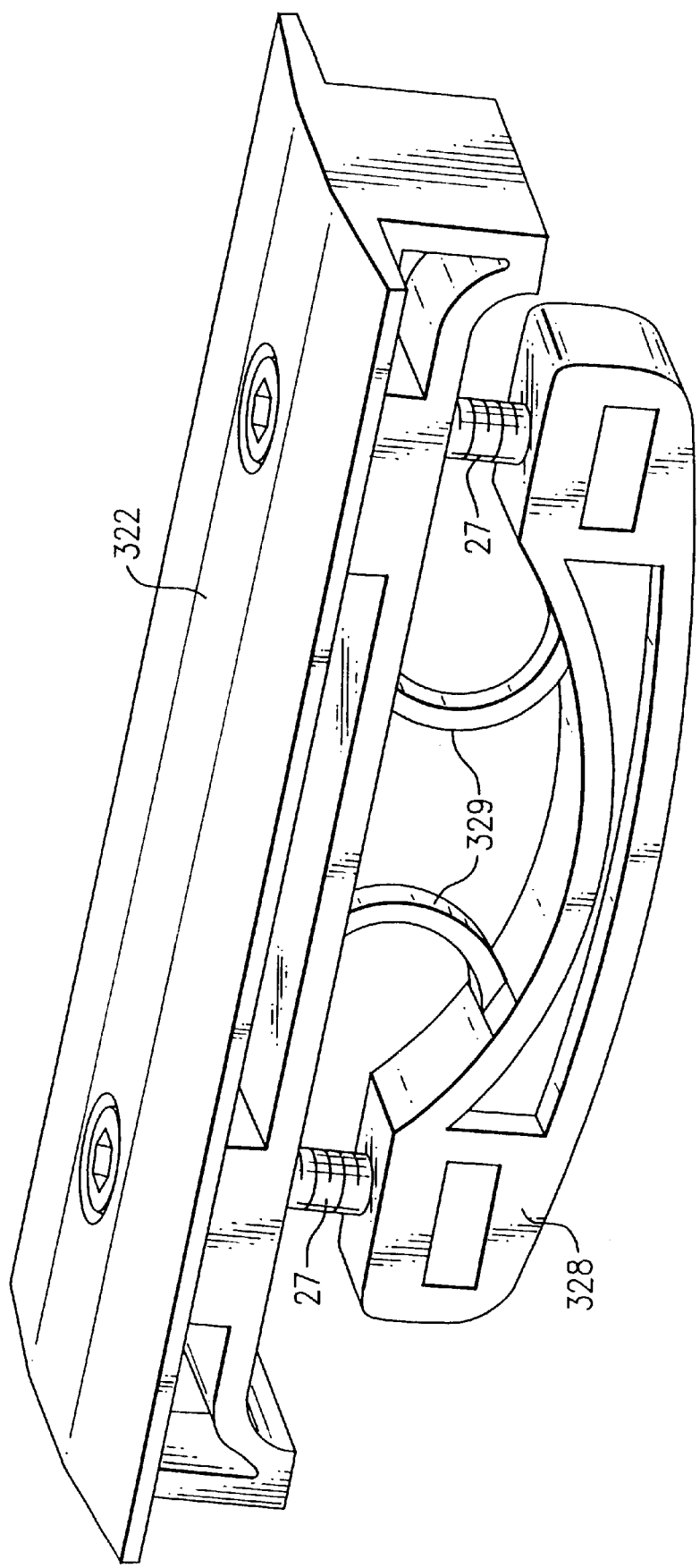
FIG. 12 is a perspective view of the clip of this embodiment.

Another embodiment of this invention is shown in FIGS. 10, 11 and 12, in which a single-piece molded clip 320 is designed for use with common roll-formed channel support beams 111, which were the type shown in the embodiment of FIGS. 4 to 7. This clip 320, similar to the previous embodiment, is designed to be tipped into the channel beam 111 with the PV module in place, i.e., held in by means of the foam tape 32. Here, there is an upper portion 322 and a lower portion 328, which are joined by flexible strut or leg members 329, with nuts or threaded inserts in the lower portion 328 to receive threaded fasteners 327 that are positioned in bolt holes that are spaced apart longitudinally on the upper clip portion 322. FIG. 10 shows an array of PV modules 15 on a support beam or channel 111, illustrating the insertion of the clips 320. One or the other of the cap screws 327 can be removed to facilitate insertion of the lower clip member 328 into the slot between the beam flanges 114, as shown in FIG. 11. The struts maintain the orientation of the upper and lower clips so that the cap screw receiving part of the lower member will be properly aligned to receive the threaded fastener or cap screw 327. As in the other embodiments, the lower surface of the upper clip portion 322 is contoured to engage the curved corners of the support beam 111. Upon installation, when the cap screws 327 are tightened down, the struts 329 bend and collapse into the arch of the lower clip portion 328.

Clips that incorporate the main principles of this invention can be provided to attachment to other types of support beams, such as round or square pipes or tubes, angles, I beams, or H beams. FIG. 13 illustrates one example in which a clamp member 422 is adapted for use with a tubular support member 411. In this case, an arched lower clamp member 428 fits behind the reverse or under side of the tubular member 411, and engages a pair of threaded fasteners such as cap screws 427. Similar to the embodiments described previously, strips 432 of a butyl tape or other suitable glazing material are applied onto the upper side of the tubular member 411 to cushion the lower side of the attached solar panels (not shown). These clamp members 422, 428 may be molded of a suitable plastic resin, or may be extruded of aluminum or another metal, or may be stamped or pressed from sheet steel.

While the invention has been described in connection with several preferred embodiments, it should be apparent that the invention is not limited only to those embodiments. Rather, many modifications and variations will be apparent to persons of ordinary skill in this art without departure from the scope and spirit of the invention, as defined in the appended claims.

I claim:

1. A fastener arrangement for attaching one or more flat rectangular solar panels onto a rack formed of one or more channel members, in combination with the rack and panels, in which the channel member has an elongated slot with a pair of inwardly facing flanges defining said slot and defining a surface supporting said solar panels which extend across said slot; said fastener arrangement comprising a clip member having a generally T-shaped profile with a stem portion with opposed flat sides and a cap portion at an upper end of the stem portion with flanges extending above said opposed flat sides, wherein the stem portion has a width sufficient to span across the slot of said channel member so that the stem portion rests on the pair of flanges of said channel member, and with the flanges of said cap portion extending out along sides of the stem portion to define recesses at opposite sides of the clip holding the edges of said solar panels against said channel member; a threaded fastener member rotatable in said stem portion and extending downward therefrom; and a channel nut adapted to be disposed within the associated channel member of the rack and to engage the flanges of said channel member, the channel nut having female threads to receive said threaded fastener therein to tighten the flanges of said clip member against the solar panels onto the rack.

2. The fastener arrangement according to claim 1 wherein said clip member is injection molded of a sturdy plastic material.

3. The fastener arrangement according to claim 1 wherein stem portion has a lower surface with contoured ends that continue over edges of said channel member.

4. The fastener arrangement according to claim 1 further comprising a pair of struts joining said clip member with said channel nut.

5. The fastener arrangement according to claim 4 wherein said struts are resilient and deformable to bend when the threaded fastener member is tightened down on said channel nut.

6. The fastener arrangement according to claim 4 wherein said struts are frangible member that break when the threaded fastener member is tightened down on said channel nut.

7. The fastener arrangement according to claim 4 wherein said clip member, said channel nut, and said struts are unitarily molded.

8. The fastener arrangement according to claim 1 wherein said threaded fastener members includes a pair of bolts arranged in a pair of holes in said clip member and which are received in respective threaded sockets in said channel nut.

9. A solar collector arrangement comprising one or more parallel rows of solar panels, each said row including:
  a rack which comprises at least one elongated channel member, said at least one channel member having an elongated slot with a pair of inwardly facing flanges defining said slot said flanges forming a supporting surface on which the solar panel are disposed and arranged across said slot;
  a plurality of flat generally rectangular solar panels; and
  a plurality of fastener arrangements holding said solar panels side by side onto said rack, each said fastener arrangement including a clip member having a generally T-shaped profile with a stem portion with opposed flat sides and a cap portion at an upper end of the stem portion with flanges extending above said opposed flat sides for engaging respective edges of said solar panels crossing over said slot, said stem portion having a width sufficiently disposed on the supporting surface and spanned across the slot onto the inwardly facing flanges of said at least one channel member; a threaded fastener member rotatable in said stem portion and extending downward therefrom; and a channel nut being disposed within the channel member engage the flanges of said channel member, the channel nut having female threads to receive said threaded fastener therein such that the channel nut can be tightened to engage the flanges of the channel member to hold the edges of the solar panels against the at least one channel member of the rack.

10. A solar collector arrangement according to claim 9 further comprising strips of glazing material interposed between said solar panels and respective ones of said at least one channel member to provide cushioning and electrical isolation between said solar panels and said channel members.

11. A solar collector arrangement according to claim 9 further comprising at least one extruded resilient filler gasket disposed between adjacent ones of said solar panels at one or both sides of each of said fastener arrangements.

12. A solar energy collection arrangement according to claim 11 wherein gasket is made of a rubberlike material.

13. A solar energy collection arrangement according to claim 11 wherein said gasket has a pair of spaced flanges along each of two opposed edges, each pair defining a receptacle for fitting over an edge of a solar panel.

14. A solar collector arrangement comprising at least one support beam, an array of rectangular solar panels attached along said support beam such that edges of said solar panel extend across said support beam, and a plurality of clamps for clamping said rectangular solar panels onto said support beam, each said clamp including an upper clamp portion having a generally T-shaped profile with a central stem and a pair of transverse flanges at upper edges of said central stem; the central stem and said pair of transverse flanges being disposed onto and spanning across the support beam; at least one threaded fastener member passing through said central stem; a lower clamp portion shaped to clamp against a portion of said support beam to hold the upper clamp portion down against said support beam, and said lower clamp portion having at least one threaded portion receiving said at least one threaded fastener member for tightening down said flanges of the upper clamp portion to hold against the support beam the edges of the solar panels that cross over the support beam.

15. Solar collector arrangement according to claim 14, wherein said lower clamp portion has a pair of bolt receiving portions and an arched portion between said bolt receiving portions.

16. Solar collector arrangement according to claim 14, further comprising at least one strip of a glazing material situated on said support beam for cushioning said solar panels.

17. A method of installing flat solar panels onto a support formed of one or more elongated support beams, comprising; the steps of: applying strips of glazing material onto one or the other of edges of the solar panels and said support beams; positioning the panels in place on the support beams so that the panels are held by the strips of glazing material onto the beams, with the panels oriented so that the edges of the panels are at a right angle to said support beams; attaching to the support beams, in spaces between adjacent ones of said panels, fastener clips, each said fastener clip including a clip member having a generally T-shaped profile with a stem portion with opposed flat sides and a cap portion at an upper end of the stem portion with flanges extending above said opposed flat sides, said stem portion and said flanges being placed onto and spanned across the support beam; a threaded fastener member rotatable in said stem portion and extending downward therefrom, and a retainer member being disposed upon and engaging a portion of the associated support beam, the retainer member having threads to receive said threaded fastener member therein; and rotating said threaded fastener member to clamp said clip member to hold said edges of said adjacent panels on said support beam.

18. A method of installing flat solar panels onto a support according to claim 17, further comprising running electrical wires carrying power from said panels through a wireway formed in said support beams.

19. A method of installing flat solar panels onto a support according to claim 17, wherein said support beam includes a channel member having one slotted side with a pair of inwardly directed flanges defining a slot therebetween; and said step of attaching said fastener clips includes for each such clip inserting the retainer member thereof through the slot, and by rotating said threaded fastener member drawing said retainer member against said inwardly directed flanges.

* * * * *

UNITED STATES PATENT AND TRADEMARK OFFICE
CERTIFICATE OF CORRECTION

PATENT NO. : 6,672,018 B2  Page 1 of 1
DATED : January 6, 2004
INVENTOR(S) : Jefferson Shingleton It is certified that error appears in the above-identified patent and that said Letters Patent is hereby corrected as shown below:

Column 11,
Line 51, "slot" should read -- slots --.
Line 52, "panel" should read -- panels --.

Column 12,
Line 28, "for" should be deleted.

Signed and Sealed this

Twenty-seventh Day of April, 2004

JON W. DUDAS
*Acting Director of the United States Patent and Trademark Office*